United States Patent [19]

Geittner et al.

[11] Patent Number: 5,188,648

[45] Date of Patent: Feb. 23, 1993

[54] METHOD OF MANUFACTURING OPTICAL FIBRES

[75] Inventors: Peter E. E. Geittner; Hans-Jürgen Hagemann, both of Aachen, Fed. Rep. of Germany; Jacques P. M. Warnier, Eijsden, Netherlands

[73] Assignee: U.S. Philips Corp., New York, N.Y.

[21] Appl. No.: 779,119

[22] Filed: Oct. 16, 1991

Related U.S. Application Data

[63] Continuation of Ser. No. 520,992, May 9, 1990, abandoned, which is a continuation of Ser. No. 143,219, Jan. 11, 1988, abandoned, which is a continuation of Ser. No. 879,775, Jun. 27, 1986, abandoned.

[30] Foreign Application Priority Data

Jul. 20, 1985 [DE] Fed. Rep. of Germany ....... 3525979

[51] Int. Cl.$^5$ ..................... C03C 25/02; C03B 37/023
[52] U.S. Cl. ..................... 65/3.12; 65/18.2; 427/163; 427/167; 427/237; 427/578
[58] Field of Search ............ 65/3.12, 3.11, 18.2; 427/38, 39, 163, 167, 237

[56] References Cited

U.S. PATENT DOCUMENTS

| | | | |
|---|---|---|---|
| Re. 30,635 | 6/1981 | Kuppers et al. | 427/38 |
| 4,145,456 | 3/1979 | Kuppers | 65/3.12 |
| 4,145,458 | 3/1979 | Koenings | 65/3.12 |
| 4,265,649 | 5/1981 | Achener | 65/3.12 |
| 4,314,833 | 2/1982 | Kuppers | 65/3.12 |
| 4,331,462 | 5/1982 | Fleming | 65/3.12 |
| 4,349,373 | 9/1982 | Sterling | 65/3.12 |
| 4,405,655 | 9/1983 | Tuin | 65/3.12 |
| 4,417,911 | 11/1983 | Cundy et al. | 65/3.12 |
| 4,468,413 | 8/1984 | Bachmann | 65/3.12 |
| 4,486,214 | 12/1984 | Lynth | 65/3.12 |
| 4,493,721 | 1/1985 | Auwerda et al. | 65/3.12 |
| 4,576,622 | 3/1986 | Jung | 65/3.2 |
| 4,718,929 | 1/1988 | Power et al. | 65/3.12 |
| 4,741,747 | 5/1988 | Geittner | 427/163 |
| 4,770,682 | 9/1988 | Van Geelen et al. | 65/13 |

FOREIGN PATENT DOCUMENTS

| | | |
|---|---|---|
| 38982 | 4/1981 | European Pat. Off. |
| 2043624 | 10/1980 | United Kingdom ........ 65/3.12 |
| 2068359 | 8/1981 | United Kingdom . |
| 2118165 | 10/1983 | United Kingdom . |

OTHER PUBLICATIONS

McGraw-Hill, Dictionary of Scientific and Technical Terms, 2nd Ed., 1978, pp. 1172, 1644, 733.

Primary Examiner—Robert L. Lindsay
Attorney, Agent, or Firm—Ernestine C. Bartlett

[57] ABSTRACT

In the PCVD method glass is deposited in layers on the inner wall of a glass tube by heating the tube to a temperature between 1100° and 1300° C., by passing a reactive gas mixture through the glass tube from a gas inlet side at a pressure between 1 and 30 hPa, by forming a plasma in the interior of the glass tube, and by reciprocating the plasma between two reversal points. After a quantity of glass corresponding to the desired fiber optical construction has been deposited, the tube is collapsed to form a solid preform from which optical fiber are draw. The range of nonconstant deposition geometry at the preform entrance, (i.e. on the gas inlet side), is reduced by interrupting the reciprocating movement of the plasma at the reversal point on the gas inlet side.

5 Claims, 1 Drawing Sheet

METHOD OF MANUFACTURING OPTICAL FIBRES

This is a continuation application Ser. No. 520,992, filed May 9, 1990, which is a continuation of Ser. No. 143,219, filed Jan. 11, 1988 which is a continuation of Ser. No. 879,775 filed Jun. 27, 1986. all abandoned.

BACKGROUND OF THE INVENTION

The invention relates to a method of manufacturing optical fibers. In the method layers of glass are deposited on the inner wall of a glass tube by heating the tube to a temperature between 110° and 1300° C., by passing a reactive gas mixture through a glass tube at the pressure between 1 and 30 hectopascal (hPa) in the interior of the glass tube a plasma by forming is reciprocated strokewise between two reversal points. After a sufficient amount of glass (corresponding to the intended optical fiber construction) has been deposited, the glass tube is then collapsed to form a solid preform from which optical fibers are drawn.

"Glass tube" is to be understood to mean in this connection a substrate tube or coating tube which consists either of (i) synthetically made amorphous silica to (ii) amorphous silica made by melting quartz crystals (fused silica or quartz glass), or (iii) both synthetically made amorphous silica and amorphous silica made by melting quartz crystals. The silica making up the glass tube may optionally be doped.

By means of the above-mentioned method, both graded index fibers and step index fibers can be manufactured. The glass are deposited in a manner corresponding to the intended fiber construction.

The manufacture of optical fibers or optical wave guides, according to the above-mentioned method, is described for example in U.S. Pat. Nos. Re 30,635 and 4,314,833. Commonly, this method is referred to as the "non-isothermal plasma CVD method" (non-isothermal PCVD method, where P=plasma and CVD=chemical vapor deposition =reactive deposition from a gas phase). In this method, glass layers are deposited directly from the gas phase on the inner wall of the glass tube (a heterogeneous reaction). The formation of glass soot in the gas phase is avoided. This is described in greater detail in particular in U.S. Pat. No. 4,314,833.

The essential difference between the PCVD method and the MCVD method, Modified CVD method (which is also used for the manufacture of optical fibers by coating the inside of a tube), resides in the manner in which the chemical reactions necessary for the deposition of glass components are activated. The MCVD method is based on thermal activation by a burner; the PCVD method uses activation by electron impact excitations. In the MCVD method, in a first stage fine dust particles (glass soot) are formed. Deposition of the soot in the temperature and gravity fields along the tube will be uniform over an extensive area and over the circumference of the tube only when the tube is rotated. Compact glass layers are obtained sintering the soot after deposition. In contrast, fine dust particles are not formed in the electron impact excitation of the PCVD method. The gaseous reaction products are rather present in a molecular form and can reach the inner wall of the glass tube via comparatively rapid diffusion and condense thereon. Consequently, the deposition is narrowly, localized and uniform over the circumference of the tube. Sintering of the deposited material is not required for obtaining a vitreous layer. This is also the reason why in the PCVD method glass can be deposited in both directions of movement of the plasma. In the MCVD method glass particles can be deposited only in one direction, namely in the direction of flow of the reactive gases.

The efficiency of the described technological methods of manufacturing preforms for optical fibers is determined decisively by the yields to be achieved by the specific methods. Essential parameters in this respect are the reproducibility of the method, the chemical reaction yields, the deposition rate and the optical and geometrical homogeneity of the deposited material over the length of the preform.

As a result of the specific reaction and deposition mechanisms, the PCVD method permits the manufacture of optically high-grade preforms with high reproducibility, reaction yields near 100% and, in comparison with other methods, low entrance taper losses. Entrance taper is to be understood to mean herein a deposition range with not sufficiently constant optical and geometrical properties at the entrance of the preform (i.e. on the gas inlet side). The homogeneous range between the entrance taper and a corresponding range at the preform end is hereinafter referred to s the "plateau region".

As transport to the tube wall in the PCVD method is determined by a rapid molecular diffusion mechanism, the extension of the deposition in the longitudinal direction of the substrate tube is, of course, very small. Homogeneous plateau regions are obtained by reciprocating the reaction zone at constant speed in the longitudinal direction of the tube. The regions of non-constant velocity at the preform ends, required for the reversal of the plasma, are chosen to be as small as possible.

With deposition rates of approximately 0.5 g/minute and preform lengths of approximately 70 cm these conditions in the PCVD method result in relatively low yield losses by taper approximately 15% (i.e. a taper length of approximately 10 cm). For practical reasons the taper length is defined as the distance between the locations where the amount of deposited glass is 10 and 90%, respectively, of the maximum amount of deposited glass in the plateau region.

Due to the different reaction and transport mechanisms as compared to the PCVD method, completely different deposition conditions are present with the MCVD method. In particular, due to the formation of glass soot by a homogeneous gas phase reaction, deposition distributions extend in the longitudinal direction of the tube and hence make additional measures for the reduction of taper losses necessary.

A measure for taper reduction in the MCVD method is described in U.K. Patent Application 2,181,165. In this document, taper is reduced by varying the speed of the burner along the tube (i.e. by moving the burner nonlinearly in a mechanical way. The nature of the movement is derived from a specific deposition function which in the MCVD method depends in a complex manner on all deposition parameters. This function must be determined experimentally by an iteration method for the specific deposition conditions. In all cases a special nonlinear movement over the whole stroke length is require. "Stroke length" is the be understood to mean the length of travel of the burner between the reversal points.

Although other possible methods of taper reduction, (for example flow variations or linear mechanical ramps, which are to be understood to mean a reduction of the burner speed at the gas inlet side) are discussed, they are also considered to be impractical or insufficient in their action. The reason for this—and hence for the above-mentioned special measures—is to be found in the MCVD method itself and is due to the following specific properties of the MCVD:

The particle size distribution and the building-in behavior for SiO$_2$ and dopants in the MCVD method depends in an extremely complex manner on all method parameters due to the thermal reaction with glass soot formation. Consequently, the deposition function can be determined only experimentally—but cannot be calculated in a quantitative way from theory.

The glass soot formation which is accompanied by deposition yields for SiO$_2$ which are below 100%, leads to an extension of the deposition region in the MCVD method. The deposition region larger than the stroke length along the tube) (i.e. glass soot also escapes in a rather large quantity from the end of the tube. For this reason to obtain a somewhat constant layer thickness, the burner must be moved nonlinearly over the whole stroke length. A homogeneous plateau region actually does not exist in the MCVD method.

A variation of process parameters other than the burner velocity for taper reduction immediately varies (again as a result of the complex behavior of building-in, yield and dust particles size the deposition profile and deposition function, the dopant incorporation, and the yields—and that simultaneously. As a result, such variations are difficult to control in the MCVD method and cannot be carried out without negative effects on the optical quality and homogeneity of the deposit.

As may be understood from what is said about the prior art, the PCVD method presents specific advantages with respect to taper losses. These advantages of the PCVD method render the expensive and problem-causing measures for taper reduction and for achieving homogeneous plateau regions in MCVD preforms redundant.

However, it is still desirable in the PCVD method to further reduce taper losses and hence to further increase process yields. In particular it should be an object to keep relative taper losses as small as possible (i.e. typically <10% of the preform length) in case the deposition rates are increased to values greater than 0.5 g/min.

SUMMARY OF THE INVENTION

It is therefore an object of the invention to provided measures for reducing as effectively as possible the ranges of nonconstnat deposition geometry at the preform entrance (geometry taper) in the manufacture of optical preforms according to the PCVD method. Such measures should, however, not have any negative effects on the optical quality of the preforms and on the high reaction yields.

According to the invention, this object is achieved by interrupting the reciprocating movement of the plasma at the reversal point on the gas inlet side. The duration of the interruption is proportioned so as to be sufficient for an effective reduction of entrance taper losses.

According to the invention, there is provided a method of manufacturing an optical fiber, said method comprising the steps of:
heating a glass tube to a temperature between 1100+ C. and 1300° C., said tube having an inside wall;
passing a reactive gas mixture at a pressure between 1 and 30 hectopascal through the glass tube, said gas mixture being introduced into the tube at a gas inlet end of the tube;
forming a nonisothermal plasma inside the tube to react the gas mixture to deposit glass layers directly on the inside wall of the glass tube without the formation of glass soot;
reciprocating the plasma between first and second reversal points inside the tube, the first reversal point being nearer to the gas inlet end of the tube than the second reversal point, to deposit a plurality of layers of glass on the inside wall of the tube, said tube having an entrance taper length adjacent the first reversal point on the gas inlet side and a homogeneous plateau region wherein the optical and geometrical properties of the deposited glass are substantially constant, said plateau region being connected to the entrance taper length and being the region between the entrance taper length and the second reversal point at the opposite end of the tube;
heat collapsing the inside-coated glass tube to form a solid preform; and
drawing an optical fiber rom the preform;
wherein each time the plasma reaches the reversal point nearer to the gas inlet end of the tube, the movement of the plasma is interrupted while glass deposition continues, the length of time during which the plasma movement is interrupted being at least 0.1 second and sufficient to result in an entrance taper length that is less than 20% of the preform length.

The invention is based on the experimentally gained discovery that an interruption of the movement of the reaction zone after the braking and prior to the acceleration in the reverse direction at the front reversal point, (i.e. on the gas inlet side), surprisingly and in contrast with the prevailing assumption that an immediate reversal would be necessary leads to a significant reduction of the entrance taper. The condition for this is, however, that the duration of the interruption under the prevailing deposition conditions is adequately proportioned.

In the PCVD method the extension of the local deposition profile and hence the length of the entrance taper increases linearly with the overall gas flow through the tube to be coated. "Local deposition profile" is to be understood to mean in this connection the distribution of the deposited glass along the glass tube which would occur when the position of the plasma were dept stationary.

It has been found experimentally that the optimum interruption duration also increases linearly with the overall gas flow. For this reason, it is advantageous to perform the deposition with overall gas flows which are as low as possible when the interruption durations should be as small as possible. With a given deposition rate the overall gas flow may, of course, not be lower than a certain value prescribed by the reaction mechanisms.

The duration of the interruption is preferably at least 0.1 second. With shorter interruption times the effect of the inventive measure on taper reduction is small and consequently its use in the PCVD method would not produce substantial improvements. An interruption of at least 0.1 seconds is longer than the time required mechanically switches the reciprocating movement of the plasma from one direction of movement to the other because in practice such switching time is less than 0.1 second.

A preferred embodiment of the method according to the invention uses a microwave resonator for producing the plasma. The movement of the resonator and plasma at the front reversal point is interrupted for a time interval $\Delta t_o$ (in seconds) according to the relationship $$0.008 \cdot \left[ \frac{\dot{Q}_T/\text{sccm}}{V_o/\text{cm s}^{-1}} \right] \leq \left[ \frac{\Delta t_o}{\text{s}} \right] \leq 0.01 \cdot \left[ \frac{\dot{Q}_T/\text{sccm}}{V_o/\text{cm s}^{-1}} \right] \quad (1)$$

in which $\dot{Q}_T$ is the overall gas flow in sccm (cubic centimeters per minute, related to standard conditions of 273K and 1013 hPa), and $V_o$ is the resonator velocity in the plateau region in centimeters per second.

According to a further preferred embodiment, the method according to the invention is combined with a method which has been suggested in German Patent Application 3,445,239, which corresponds substantially to U.S. Pat. No. 4,741,747. In this method the plasma at the area of at least one reversal point is temporarily moved nonlinearly and/or is temporarily varied in its extension in the longitudinal direction of the glass tube.

The area in which the plasma is moved nonlinearly preferably corresponds to less than 2% of the overall stroke length. The stroke length is the distance of travel between the reversal points of the plasma.

Additionally, with a given plasma stroke length, the gas flows are preferably adjusted according to the relationship $$2.65 \leq \left[ \frac{\dot{Q}_T}{\dot{Q}_{SiCl_4}} \right] \cdot \left[ \frac{m_{SiO_2}}{\text{g/min}} \right] \leq 7.25 \cdot \left[ \frac{z_p}{m} \right] \quad (2)$$

in which $\dot{Q}_T$ and $\dot{Q}_{SiCl_4}$ are the overall gas flow and the gas flow of the SiO$_2$-forming chlorides in sccm, $m_{SiO_2}$ the deposition rates of SiO$_2$ in grams per minute, and $z_p$ is the stroke length in m, and where $\dot{Q}_T$ in the validity range of the equation (2) must have a value which is as low as possible.

$\dot{Q}_t/\dot{Q}_{SiCl}$ should preferably be chosen to be $\leq 3$ so as to ensure a quantitative reaction yield. The choice of the gas flows according to relation (2) ensures that in each case the relative taper losses remain smaller than 20% of the preform length (upper limit) and the flow conditions correspond to deposition rates which necessitate a taper reduction on the basis of the economy of the method.

Furthermore, it is appropriate to adjust the overall gas flow at $\dot{Q}_t \leq 1000$ sccm and the chloride gas flow at $\dot{Q}_{SiCl_4} 23$ 185 sccm (corresponding to a deposition rate $m_{SiO_2}=0.5$ g/minute), since with lower flow and deposition rates, the taper losses as a rule are sufficiently small also without using the measure according to the invention.

The stroke length of the plasma is preferably smaller than or equal to 300 cm. For technical reasons (tube deformations upon coating and collapsing, dimensions of the coating apparatus, handling of the preforms), larger stroke lengths can be used with only great difficulties.

DESCRIPTION OF THE PREFERRED EMBODIMENTS

Figure 1:
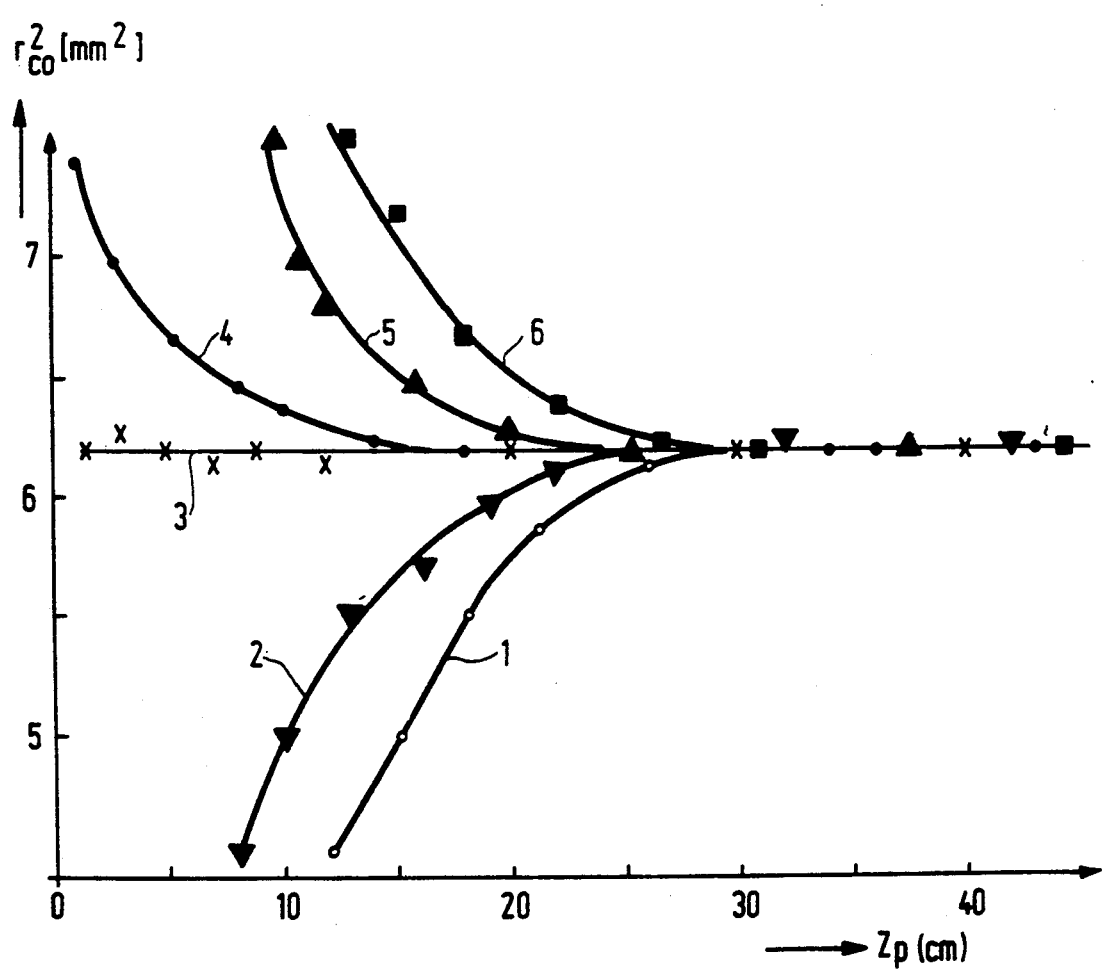
FIG. 1 shows a series of curves representing optical preform tapers under different production conditions.

In all the embodiments, preforms having a step index profile in the core area were manufactured by using the PCVD method. All deposition conditions, except the duration of the interruption, were kept constant.

Quartz glass tubes (23×20 mm) were used. The resonator velocity was 11.7 cm/sec over a stroke length of 70 cm. At the end point, the resonator velocity was decreased to zero over a ramp length of 1.2 cm, and was increased to the nominal value in the reverse direction in the same way.

The gas flows during the entire deposition duration were $\dot{Q}_{O_2}=1795$ sccm, $\dot{Q}_{SiCl_4}=323$ sccm and $\dot{Q}_{GeCl_4}=36$ sccm and they remained constant. The deposition rate was approximately 1.0 g.min$^{-1}$. The other PCVD parameters were also kept constant at values optimized for these deposition rates. The substrate temperature was 1220° C., the deposition pressure was approximately 16 hPa, and the coupled-in microwave power uses approximately 2.0 kW. The overall number of deposited layers of approximately 470 corresponded to an effective overall deposition duration between 45 and 70 minutes depending on the duration of the interruptions.

After the deposition, the glass tubes were collapsed and were then measured with a P$_{101}$-Preform analyzer (Fa. Yorck TEchnology) with respect to (i) the core geometry (radius $r_{co}$), and (ii) the optical refractive index difference between the deposited core material and the SiO$_2$ substrate tube. Both were measured as a function of the stroke length $z_p$.

The measured results are shown graphically in FIG. 1. In this type of measurement the location of deposition with respect to the resonator center (an the reversal points, respectively), the geometry of the deposited mass, and the optical refractive index along the preform can be determined simultaneously.

The following results and examples show essentially only the geometrical entrance taper, and the effect of the method according to the invention on the reduction of the taper area. The agreement of calculated values for the core radius and experimentally measured core radii confirmed that the method yield was quantitative in all the examples.

EXAMPLES

Without the use of an interruption, the PCVD deposition yielded under the above-given conditions a geometrical entrance taper having a length of approximately 17 to 18 cm ($\Delta t_o=0.0$ seconds, FIG. 1, curve 1).

With an interruption of 0.8 seconds at the foremost reversal point, the reduction of the geometrical entrance taper is approximately 14 cm ($\Delta t_o=0.8$ seconds, FIG. 1, curve 2).

With an interruption of 1.6 seconds the entrance taper decreased to a length of less than 2 cm ($\Delta t_o=1.6$ seconds, FIG. 1, curve 3). From relation (1) for the given PCVD conditions a value of $$1.6 \text{ seconds} = \Delta t_o = 0.009 \cdot \left[ \frac{Q_T/\text{sccm}}{V_o/\text{cm s}^{-1}} \right]$$

With an interruption of 1.7 seconds the layer thickness deficit which occurs in the entrance range without an interruption is overcompensated. A value of 110% of the desired layer thickness in the plateau region is reached at a distance of approximately 4 cm from the foremost reversal point ($\Delta t_o = 1.7$ seconds, FIG. 1, curve 4). This entrance taper is still much less than the uncompensated value of 17 to 18 cm.

In the case of even longer interruptions of 2.1 and 3.1 seconds ($\Delta t_o = 2.1$ seconds and 3.1 seconds, FIG. 1, curves 5 and 6 the overcompensation increases, which leads to a further increase in entrance taper length to 12 cm and 16 cm, respectively.

What is claimed is:

1. A method of manufacturing an optical fiber, said method comprising the steps of:
   heating a glass tube to a temperature between 1100° C. and 1300° C., said tube having an inside wall, a longitudinal section, and two ends attached thereto, one of said ends being a gas inlet end of the tube, the other of said ends being connected to the longitudinal section remote from the gas inlet end;
   passing a reactive gas mixture at a pressure between 1 and 30 hectopascal through the glass tube, said gas mixture being introduced into the tube t the gas inlet end of the tube;
   forming a nonisothermal plasma inside the tube to react the gas mixture to deposit glass from a gas phase in layers directly on the inside wall of the glass tube by a non-isothermal method of plasma chemical vapor deposition of glass without the formation of glass soot in the gas phase;
   reciprocating the plasma between first and second reversal points inside the tube, the first reversal point being nearer to the gas inlet end of the tube than the second reversal point which is located near the other end of the tube, to deposit a plurality of layers of glass on the inside wall of the tube, said tube having an entrance taper length adjacent to the first reversal point on the gas inlet side and a homogeneous plateau region wherein the optical and geometrical properties of the deposited glass are constant, said plateau region being connected to the entrance taper length and being the region between the entrance taper length and the second reversal point at the other end of the tube;
   heat collapsing the glass tube to form a solid preform; and
   drawing an optical fiber from the preform;
   wherein each time the plasma reaches the reversal point nearer to the gas inlet end of the tube, the movement of the plasma is interrupted while glass deposition continues, the entrance taper being minimized by such interruption of the plasma movement, the length of time during which the plasma movement is interrupted being t least 0.1 second and sufficient to result in an entrance taper length that is less than 20% of the preform length but less than a length of time that will result in an entrance taper length that exceeds 20% of the preform length.

2. A method as claimed in claim 1 wherein said plasma is reciprocated between the reversal points by the action of a microwave resonator.

3. A method as claimed in claim 1 wherein said plasma at the area of at least one reversal point is moved non-linearly in an area corresponding to less than 2% of the distance between the reversal points.

4. A method as claimed in claim 1 wherein the glass deposition rate is approximately equal to or greater than 0.5 grams per minute.

5. A method as claimed in claim 4 wherein the preform length is approximately 70 centimeters.

* * * * *